Patented June 23, 1925.

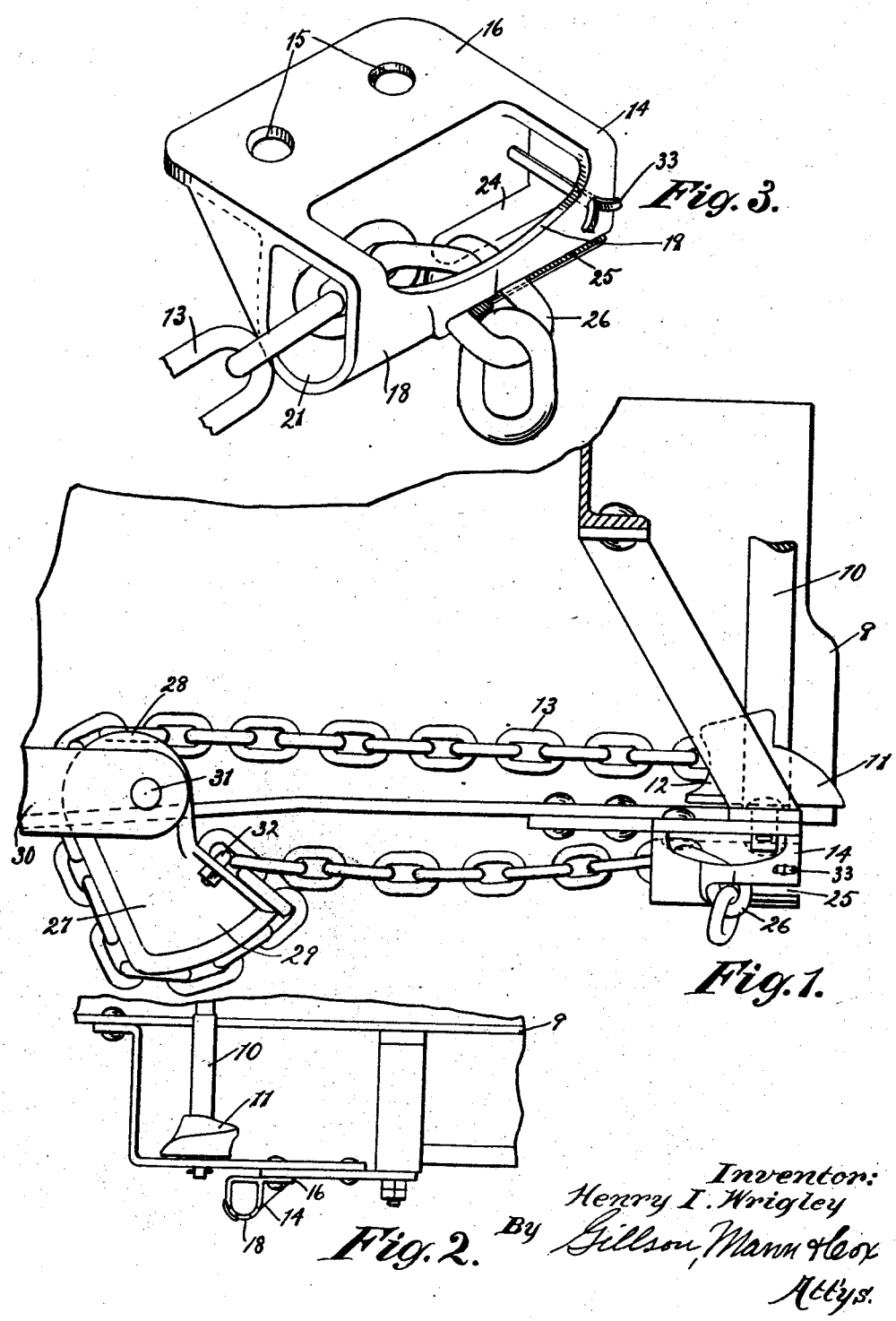

1,543,467

UNITED STATES PATENT OFFICE.

HENRY I. WRIGLEY, OF CHICAGO, ILLINOIS, ASSIGNOR TO UNIVERSAL DRAFT GEAR ATTACHMENT CO., A CORPORATION OF ILLINOIS.

BRAKE MECHANISM.

Application filed November 28, 1924. Serial No. 752,535.

*To all whom it may concern:*

Be it known that I, HENRY I. WRIGLEY, a citizen of the United States, and resident of Chicago, county of Cook, and State of Illinois, have invented certain new and useful Improvements in Brake Mechanism, of which the following is a specification, and which are illustrated in the accompanying drawings, forming a part thereof.

This invention relates to brakes, and more particularly to brake mechanism for railway cars.

One of the objects of the invention is the provision of a brake mechanism having an anchor member provided with new and improved means for adjustably attaching the brake chain thereto.

Other objects of the invention are the provision of a new and improved anchor member that is cheap to manufacture, simple in construction, efficient in use, and that is not likely to become broken, deranged or get out of order.

Other and further objects and advantages of the invention will appear from the following description, taken in connection with the accompanying drawings, in which Fig. 1 is an end elevation of a portion of a railway car showing my invention in position thereon;

Fig. 2 is a side elevation thereof, with parts removed; and

Fig. 3 is a perspective view of the anchoring device.

On the drawings, the reference character 9 designates a car end to which is journaled a brake staff 10. On the lower end of the brake staff is mounted a conical drum 11 provided with a spiral groove 12 in which one end of a brake chain 13 is adapted to be wound.

The chain is connected to the brake staff or drum in any suitable manner. The opposite end of the chain is adjustably connected to an anchor member 14 secured adjacent one end of the car 9, in any suitable manner as by means of bolts or rivets engaging the opening 15 in the plate 16.

The anchor member 14 comprises a base plate 16 provided with an off-set extension forming a casing 18 open at each end. The top wall of the casing and the adjacent upper portion of the outer wall may, if desired, be cut away, as at 19, in order to lighten the device, although it may be otherwise. The opening in the side wall resulting from cutting away a portion of the same affords access to the interior of the casing to facilitate passing the chain therethrough, in attaching it to the anchor member.

The lower wall 21 of the casing 18 is provided at its outer end with slots 24 and 25 at the sides thereof. The slots are of sufficient width to receive a link of the chain when the link is turned flat-wise. The slot 25 is deeper than the slot 24. Preferably the difference in the lengths of the slots is equal to one-half the length of one of the links of the chain 13, whereby a corresponding adjustment in the effective length of the chain may be obtained. If it is desired to shorten the effective length of the chain from the position shown in Figs. 1 and 3, the link 26 is moved into the slot 24. If it is desired to lengthen the effective length of the chain only the distance of a half link, said link 26 is engaged in the slot 24.

The chain 13 extends about a power transmitting lever 27 having a short arm 28 and a long arm 29. The lever is provided with a groove for receiving said chain. The chain engaging face of the short arm 28 is curved as shown in Fig. 1. The lever 27 is pivoted in a forked end of the brake rod 30 as at 31, the pivot 31 being arranged eccentric to said curve. The long arm 29 is in the form of a segment, and the chain 13 is attached to a radial face of said segment at the rear thereof, as by means of the bolt 32.

The parts are so arranged that the initial turning of the brake staff 10 will cause the chain 13 to wind on the greatest diameter of the conical drum 11 and, simultaneously operating on the short arm 28 of the lever 27, will cause the long arm 29 to rapidly take up the slack in the brake operating mechanism.

During the final turning movement of the brake staff 10, when the brake shoes have come into engagement with the wheels, the lever 27 will have been reversed, the chain 13 will be winding on the staff 10 and operating on the long arm of the lever, thus giving the greatest mechanical advantage in applying the brakes. It is necessary in this arrangement that the parts be so arranged that when the chain 13 is being wound on the largest diameter of the drum it will be operating on the short arm of the lever 27 and vice versa. In order to accomplish this result it is necessary that the effective length of the chain 13 be predetermined for any particular installation. This is accomplished by lengthening or shortening the effective length of the chain by means of the anchoring device as described above.

Suitable means are provided for preventing the accidental disengagement of the chain 13 from the slots 24 and 25. Any suitable means may be provided for this purpose. As disclosed on the drawing, a cotter pin or key 33 extending through the rear end of the casing 18 is employed for this purpose.

It is thought from the foregoing taken in connection with the accompanying drawings that the construction and operation of my device will be apparent to those skilled in the art, and that various changes in size, shape, proportion and details of construction may be made without departing from the spirit and scope of the appended claims.

I claim as my invention:

1. An anchoring device for brakes comprising a casing having an axial bore, for receiving one end of a brake chain, the wall of said casing being provided with a slot open at one end for engaging a link of a brake chain for anchoring the same, and means for securing said casing to a car.

2. In combination, an anchoring device comprising a casing having an opening therein, one of the walls of said opening being provided with slots of unequal depths, a brake chain in said opening, a link of said chain being adapted to engage either of said slots for securing one end of said chain to said anchoring device.

3. An anchoring device for railway brake chains comprising a casing having an opening in its inner wall for the reception of a brake chain, the wall of said casing being provided with slots of unequal distances from said forward wall, the difference in said distances being substantially equal to one half the length of one of the links of said chain, and means for attaching said device to a support.

4. An anchoring device for a railway brake chain comprising a casing having a bore extending therethrough for the reception of said chain, the casing being provided with slots of unequal length, adjacent each side of the bottom wall thereof, for receiving a link of said chain flatwise for adjusting the effective length of said chain, and a pin extending across said bore for preventing the accidental release of said chain from said device.

5. An anchoring device for chains for railway brakes comprising a casing having an opening in the inner wall thereof for the reception of a brake chain, and means integral with said casing for adjustably connecting an individual link of said chain to said casing.

6. An anchoring device for railway brake chain comprising a casing having a bore extending therethrough for the reception of one end of said chain, said casing being provided with a plurality of slots of unequal length for receiving a link of said chain flatwise for adjusting the effective length of said chain, and means for preventing accidental disengagement of said chain from said device.

In testimony whereof I affix my signature.

HENRY I. WRIGLEY.